United States Patent [19]
Ota

[11] 3,867,856
[45] Feb. 25, 1975

[54] TAIL STOCK

[75] Inventor: Takeshi Ota, Aichi-ken, Japan

[73] Assignee: Toyoda Koki Kabushiki Kaisha, Aichi-ken, Japan

[22] Filed: Mar. 28, 1974

[21] Appl. No.: 456,003

[30] Foreign Application Priority Data
Apr. 5, 1973 Japan.............................. 48-41147

[52] U.S. Cl....................................... 82/31, 51/236
[51] Int. Cl............................................ B23d 23/00
[58] Field of Search.......................... 82/31; 51/236

[56] References Cited
UNITED STATES PATENTS

| | | | |
|---|---|---|---|
| 2,002,971 | 5/1935 | Zimmerman.......................... | 82/31 X |
| 2,113,124 | 4/1938 | Zimmerman.......................... | 82/31 X |
| 2,860,538 | 11/1958 | Bruet...................................... | 82/31 |
| 3,402,513 | 9/1968 | Maack.................................... | 82/31 X |
| 3,553,907 | 1/1971 | Price...................................... | 82/31 X |
| 3,590,536 | 7/1971 | Fisher.................................... | 51/236 |

Primary Examiner—Harrison L. Hinson
Attorney, Agent, or Firm—Oblon, Fisher, Spivak, McClelland & Maier

[57] ABSTRACT

A tail stock used for compensating for the tapering of a workpiece during machining operations which comprises a center sleeve slidably and rotatably mounted in a housing and having a bore with a predetermined eccentricity for holding a center and an axial guide way formed on its periphery, roller means always maintained in abutting engagement with the guide way and movable in dependence upon rotational motion of the center sleeve in order to maintain such engagement, and compensating means operatively connected to the roller means for rotatably moving the center sleeve through the roller means in accordance with differences of diameter detected in two spaced portions of the workpiece.

12 Claims, 7 Drawing Figures

TAIL STOCK

BACKGROUND OF THE INVENTION

1. Field of the Invention

The present invention relates generally to a tail stock in a grinding machine, and more particularly to an improved tail stock for use in a grinding machine which is capable of compensating for undesired taper being ground on the outer periphery of a workpiece during a grinding operation thereon.

2. Description of the Prior Art

In machine tools, such as, for example, cylindrical grinding machines, a workpiece is finished with a slightly tapered profile on the outer periphery thereof whenever the axis of the workpiece is not maintained precisely parallel to the outer peripheral surface of a grinding wheel. Even when a parallel relationship between the axis of the workpiece and the outer peripheral surface of the grinding wheel is accurately set prior to performing such grinding operations, the workpiece is still apt to be ground with a tapered profile because of thermal deformation caused on the structural componenets of the grinding machine during repeated grinding operations or cycles. Moreover, since the axis of the work center is obliged to deviate by a minute amount from an original position thereof because of the machining resistance, a tapered, or inferior, workpiece is likely to be unavoidably created. Therefore, it is really essential to compensate for such tapering of the workpiece or differences of diameter in two spaced portions of the workpiece periphery when performing such grinding operations thereon.

In order to satisfy such requirements for compensating for workpiece tapering, according to a conventional tail stock, a center sleeve which eccentrically sustains a center is provided with an axially extended guide way on the outer periphery thereof, the cross-section of which guide way is formed into a tooth groove of a gear. Furthermore, an engaging member having a head portion which is formed with the tooth profile of a rack is meshed with the guide way. Thus, the center sleeve can be rotated by imparting sliding movement to the engaging member through adjusting screw means arranged on the opposite sides of the engaging member with the aid of an operator so as to change the position of the center and thereby compensate for tapering of the workpiece.

In such ordinary tail stocks, the compensation is quite troublesome for an operator who is required to make such compensating adjustments many times, and much skill is required of the operator in order to adjust or compensate the position of the center accurately. Also, a fine compensation for the position of the center and an axial motion of the center sleeve are not able to be smoothly attained with a high degree of accuracy since backlash or a certain amount of play inevitably exists between the engaging member and the guide way.

SUMMARY OF THE INVENTION

Accordingly, it is an object of the present invention to provide a new and improved tail stock capable of compensating for tapering of a workpiece or differences of diameter in two spaced portions thereof being undesirably ground thereon during machining operations.

Another object of the present invention is to provide an improved tail stock for compensating for workpiece tapering in grinding operations which is simple in operation, but can nevertheless attain a high degree of compensating accuracy.

Still another object of the present invention is to provide an improved tail stock wherein a center sleeve for holding a center with a predetermined eccentricity is rotatably moved by roller means, which are operatively connected with an adjusting member of compensating means so as to be movably directed to a rotational direction of the center sleeve.

The foregoing and other objectives are achieved according to the present invention through the provision of a center sleeve which is slidably and rotatably mounted in a housing and has a bore therein with a predetermined eccentricity for holding a center and a guide way formed on the periphery and axially thereof, roller means always maintained in abutting engagement with the guide way and movable in dependence upon rotational motion of the center sleeve in order to maintain such engagement, and compensating means operatively connected to the roller means for rotatably moving the center sleeve through the roller means in accordance with differences detected in the diameters of two spaced portions of the workpiece.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views and in which.

DETAILED DESCRIPTION OF THE PREFERRED EMBODIMENT

Figure 1:
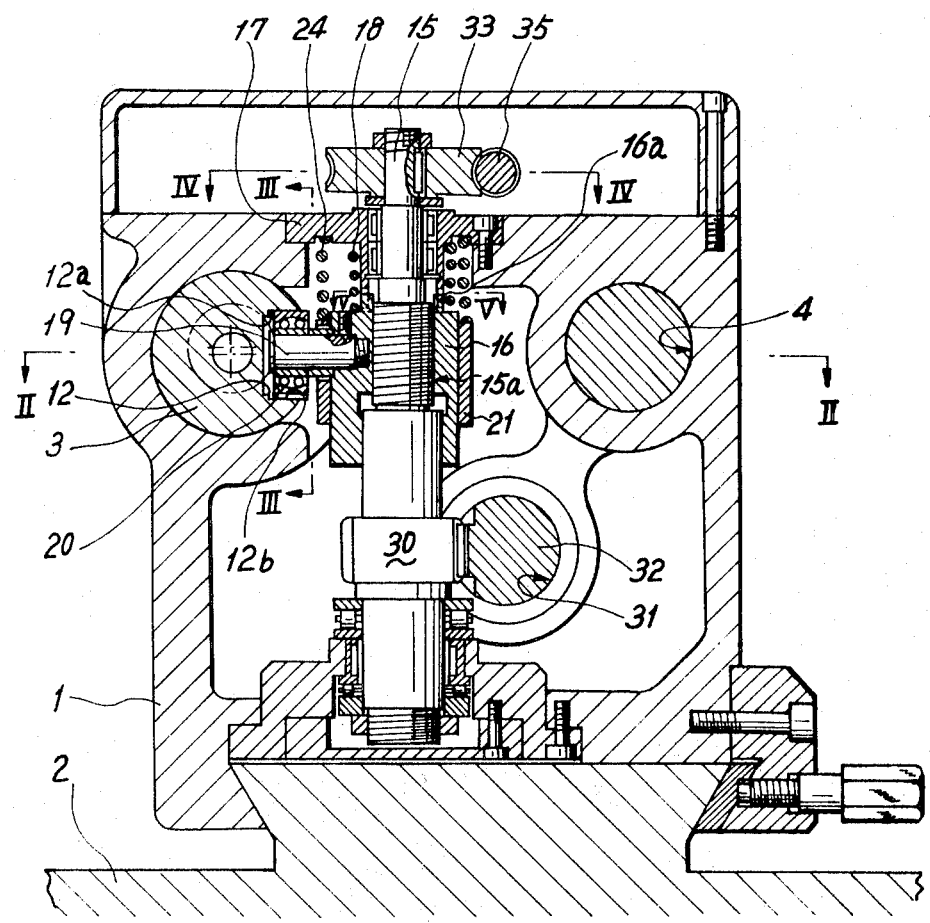
FIG. 1 is a cross-sectional view of a tail stock constructed according to the present invention.
Figure 2:
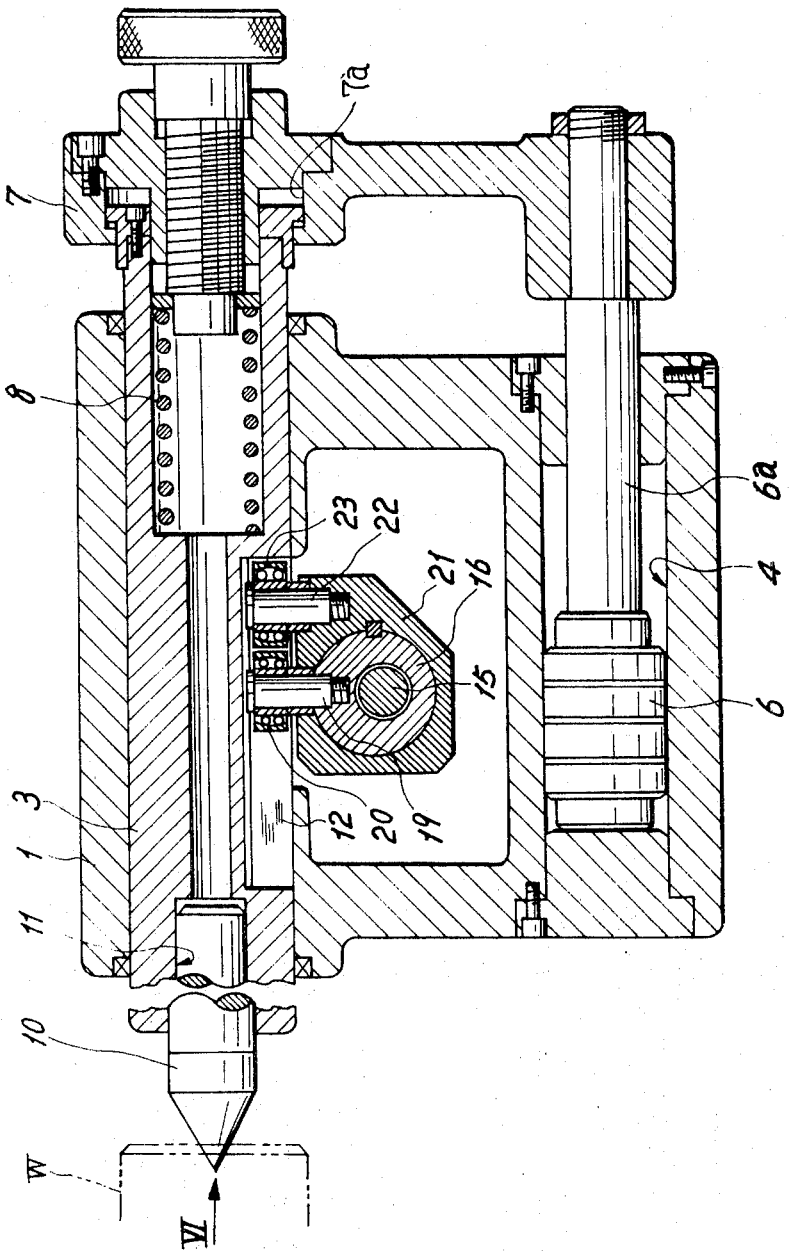
FIG. 2 is a cross-sectional view taken along the line II — II in FIG. 1.

Referring now to the drawings, and more particularly to FIGS. 1 and 2 thereof, reference numeral 1 designates a tail stock housing which is slidably mounted on a table 2. The fixed position of the housing 1 is settable in a longitudinal direction of the table 2 in accordance with the length of a workpiece W to be machined. A center sleeve 3 is slidably received within the housing 1 and a hydraulic cylinder 4 is also disposed therein in parallel relation to the sleeve 3 for axially moving the sleeve toward and away from the workpiece W. A piston rod 6a, extending from a piston 6 which is slidably mounted within the hydraulic cylinder 4, is rigidly secured to a connecting member 7, which in turn is coupled with the center sleeve 3 which, as shown in FIG.

2, is slidably received within a cylindrical bore 7a formed in the connecting member 7. A spring 8 is interposed within an axial bore formed in the right-hand portion of the center sleeve 3, as viewed in FIG. 2, so as to leftwardly urge the center sleeve 3 relative to the connecting member 7, or in the direction of the workpiece W.

Figure 6:
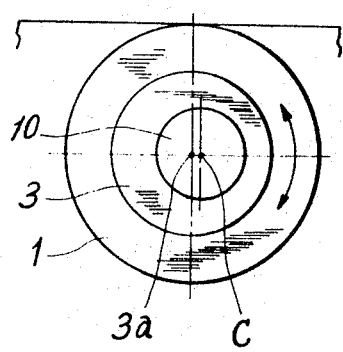
FIG. 6 is a view seen from the direction of an arrow VI in FIG. 2.

A tapered bore 11 is formed in the left end portion of the center sleeve 3, the axis C of which is deviated by a predetermined amount from an axis 3a of the center sleeve 3, as best shown in FIG. 6. A center 10 is held in complementary engagement with the tapered bore 11. Therefore, the position of the center 10 is changed from the position shown in FIG. 6 in accordance with any rotation of the center sleeve 3. Also, a guide way 12 is formed on the periphery of the center sleeve 3 and extends in the axial direction thereof.

Figure 5:
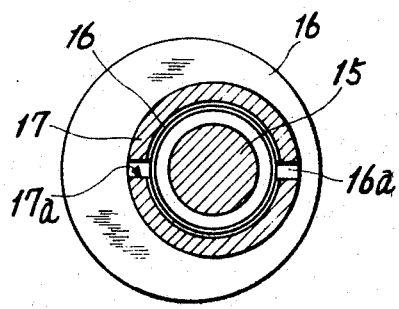
FIG. 5 is a cross-sectional view taken along the line V — V in FIG. 1.

An adjusting shaft 15 is rotatably supported by means of anti-friction bearings within a bearing member 17 fixedly mounted on the housing 1, being in perpendicular relation to the axis of the center sleeve 3 so as to be restrained from being axially moved by thrust bearings. A threaded portion 15a which is formed on the adjusting shaft 15 is threadably engaged with an adjusting member 16, on the upper end of which two axially extending engaging projections 16a are integrally formed, as shown in FIGS. 1 and 5. Recesses are formed in the lower end of the bearing member 17 which complementarily engage with the engaging projections 16a. Thus, the adjusting member 16 is axially shiftable, but is prevented from making any rotational movement. A spring 18 is interposed between the adjusting member 16 and the bearing member 17 for eliminating backlash caused between the threaded portion 15a and the adjusting member 16. A first supporting shaft 19 is threadably mounted on the adjusting member 16 in perpendicular relationship thereto, on which a first roller 20, such as, for example, an outer race, arranged in a self-aligning ball bearing, is rotatably mounted so as to be tiltably moved with respect to an axial direction of the shaft 19 in abutting engagement with an upper wall 12a of the guide way 12, as viewed in FIG. 1.

A complementary member 21 is slidably mounted on the circumferential portion of the adjusting member 16 without interference with the first supporting shaft 19. A second supporting shaft 22 is fixedly mounted on the complementary member 21 in parallel relation with the first supporting shaft 19, and a second roller 23 is rotatably mounted on the second supporting shaft 22 so as to be tiltably moved with respect to the axis of the shaft 22. Of course, the outer race of the self-aligning ball bearing may be employed as in the case of the first roller 20. The second roller 23 is also held in abutting engagement with the lower wall 12b of the guide way 12, as shown in FIG. 1.

Figure 3:
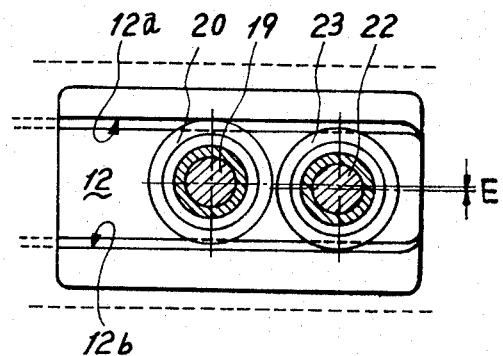
FIG. 3 is a cross-sectional view taken along the line III — III in FIG. 1.

A compression spring 24 is inserted between the bearing member 17 and the complementary member 21 in order to axially urge the latter by means of the resilient force thereof. The second roller 23 can be, therefore, urged toward the lower wall 12b of the guide 12 by the resilient force of the compression spring 24 through the axial movement of the complementary member 21, as seen in FIG. 3.

Figure 7:
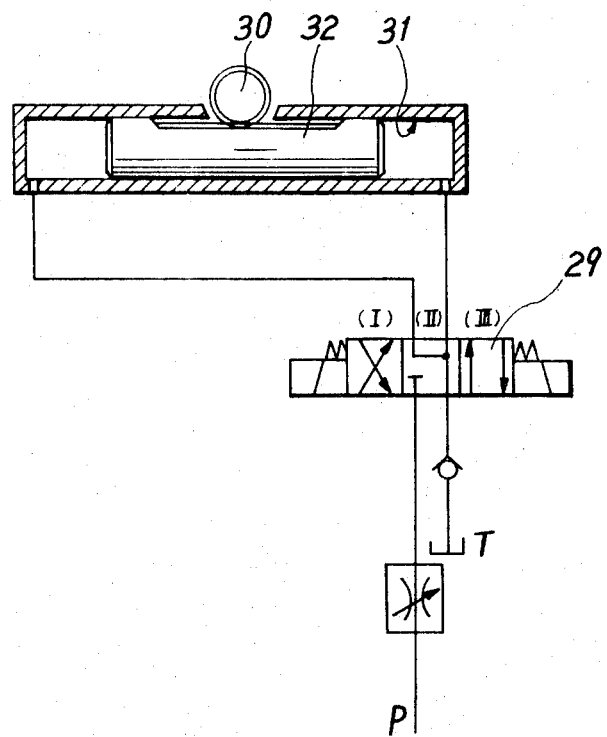
FIG. 7 is a view showing a hydraulic circuit for controlling the actuation of a hydraulic cylinder constructed in a tail stock of the present invention.

Furthermore, a pinion 30 is integrally formed on the lower portion of the adjusting shaft 15 which meshingly engages a rack piston 32 slidably mounted within a hydraulic cylinder 31 provided on the housing 1 for automatically rotating the adjusting shaft 15. To effect slidable movement of the rack piston 32, and thus rotation of shaft 15, fluid under pressure P is supplied into the hydraulic cylinder 31 from a fluid source, not shown, through a change-over valve 29, as shown in FIG. 7.

Figure 4:
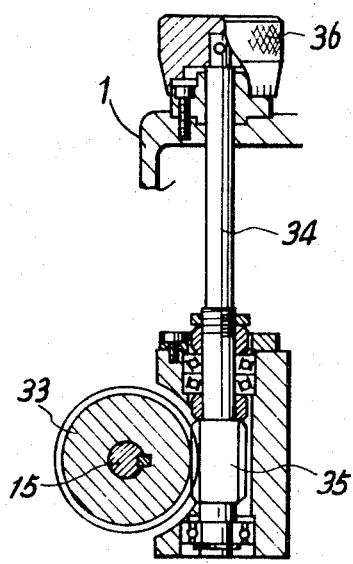
FIG. 4 is a cross-sectional view taken along line IV — IV in FIG. 1.

Also, a worm wheel 33 is fixedly keyed to the top portion of the adjusting shaft 15 in meshing engagement with a worm 35. The worm is fixedly mounted on the one end of a rotary shaft 34 which is rotatably journaled in the housing 1, but refrained from axial movement therein, as shown in FIG. 4. In addition, each tooth of the worm 35 has such a lead angle that the rotation of the worm wheel 33 can be transmitted to the worm 35. Moreover, a manual adjustment knob 36 is fixed on the other end of the rotary shaft 34 and is provided with scale marks for indicating the degree of rotational movement thereof. The manual adjustment knob 36 is manually operated for rotating the adjusting shaft 15 through the cooperation of the worm 33 and the worm 35.

Next, the compensating operation in a tail stock constructed according to the present invention will be described in detail.

Before commencing the compensating operation, the workpiece W is loaded and positively supported between the center 10 and another center mounted on a head stock, not shown, as fragmentarily shown in FIG. 2. Thereafter, the workpiece W is rotated by a suitable drive means, as well known to those skilled in the art, and is machined or ground by a tool or a grinding wheel for finishing a predetermined size or shape. When it is necessary to compensate for tapering being caused on the workpiece W, or differences of diameter in two spaced portions of the workpiece, to thereby permit further finishing machining operations after a normal machining operation, the position of the axis of the center 10 is adjusted or compensated.

Firstly, the manual compensating operation will be more fully explained.

The change-over valve 29 shown in FIG. 7 is switched to a position (II) and when the manual adjustment knob 36 is adjustably rotated by the operator, the rotation thereof is transmitted to the adjusting shaft 15 through the worm 35 and the worm wheel 33. The first supporting shaft 19 is shifted by cooperation of the adjusting shaft 15 and the adjusting member 16 along the axial direction of the adjusting shaft 15, for example, in the upward direction in FIG. 1. The center sleeve 3 is rotated in a counter-clockwise direction as viewed in FIGS. 1 and 6, by the first roller 20 through the axial displacement of the first supporting shaft 19. At this time, the outer peripheral portions of the first and second rollers 20 and 23 are always maintained in abutting engagement with the upper and lower walls 12a and 12b of the guide way 12, respectively, being disposed apart by a predetermined amount E shown in FIG. 3, from each other because the second roller 23 is resiliently urged relative to the first roller 20.

As a result of the afore-mentioned rotation of the center sleeve 3, the axis C of the center 10 held in engagement with the tapered bore 11 of the center sleeve 3 is deviated in the counter-clockwise direction from the original position shown in FIG. 6. Thus, the deviation amount of the center 10 is adjusted precisely by turning the manual adjustment knob 36 with reference to the scale marks.

Also, in case the position of the axis C of the center 10 is adjusted or compensated by the manual operation and it is not required to adjust the position thereof, the change-over valve 29 is always maintained at the position (II). Therefore, sliding movement of the rack piston 32 is freely permitted within the hydraulic cylinder 31 in accordance with the rotation of the pinion 30 during the manual compensating operation.

An automatic compensating will now be explained in detail.

Assuming that machining operations are being performed on the workpiece W, and the sizes or dimensions of the diameter in two spaced portions of the workpiece W are measured and detected by means of actuation of a sizing device, not shown, mounted on the table 2. If the diameters of the two spaced portions of the workpiece W do not simultaneously reach a predetermined value, with a desirable tolerance of dimension, the change-over valve 29 is switched from the position (II) to a position (I) or a position (III) in response to an electrical signal generated by the sizing device.

In consequence of this, pressurized fluid is directed to the left or right chamber of the hydraulic cylinder 31, whereby the rack piston 32 is slidably moved to thereby rotate the adjusting shaft 15 through the pinion 30. Thus, the position of the axis C of the center 10 is adjustably changed in the direction of the arrows, from the situation viewed in FIG. 6, as well as the aforementioned manual compensatory operation. Subsequently, the moment the diameters of two spaced portions of the workpiece W are brought into the same predetermined dimension, with the desirable tolerance in the machining operations, in accordance with the displacement of the center 10, a sizing signal is emitted by the sizing device. The change-over valve 29 is, therefore, changed to the position (II) in response to the sizing signal, resulting in the rotation of the adjusting shaft 15 being stopped by the cessation of sliding movement of the rack piston 32, to thereby maintain the center 10 immovable.

Consequently, it is apparently appreciated that the compensation for taper of the workpiece, or differences in the diameter in two spaced portions thereof, to be machined has been performed completely.

After the machining operation on the workpiece is completed, the center sleeve 3 is moved toward the right, that is, retracted by the actuation of the hydraulic cylinder 4. By the way, the outer peripheries of the first and second rollers 20 and 23 are always held in abutting engagement with the upper and lower walls 12a and 12b of the guide 12 in spite of the rotational motion of the center sleeve 3 during the compensating operation, since the rollers 20 and 23 are respectively tiltable with respect to the axes of the first and second supporting shafts 19 and 22. As a result, the first and second rollers 20 and 23 roll smoothly along the upper and lower walls 12a and 12b, respectively, without obstructing the sliding movement of the center sleeve 3 when the retracting movement of the center sleeve 3 is performed.

Additionally, it will be easily noted that an intermittent drive means, such as, for example, a pulse motor, may be employed for rotating the adjusting shaft 15 instead of the hydraulic cylinder 31 of a direct-drive type and the change-over valve 29.

Obviously, many modifications and variations of the present invention are possible in light of the above teachings. It is to be understood, therefore, that within the scope of the appended claims, the invention may be practiced otherwise than as specifically described herein.

I claim:

1. A tail stock for compensating for tapering of a workpiece to be machined, comprising:
    a housing;
    a center sleeve slidably and rotatably mounted in said housing, said center sleeve having a bore with a predetermined eccentricity in one end thereof for holding a center and a guide way parallel to the axis thereof on the periphery thereof;
    actuating means for sliding said center sleeve in said housing;
    roller means for engaging said guide way and movable in dependence upon rotational motion of said center sleeve so as to keep engaging said guide way;
    compensating means provided on said housing and operably connected to said roller means for rotatively moving said center sleeve by allowing said roller means to move in a rotational direction of said center sleeve; and
    driving means operatively connected with said compensating means for actuating the same.

2. A tail stock according to claim 1, wherein said compensating means comprises:
    an adjusting shaft rotatably mounted in said housing in perpendicular relation to the axis of said center sleeve, said adjusting shaft having a threaded portion; and
    an adjusting member threadably engaged with said threaded portion and prevented from rotational motion being operably connected with said roller means.

3. A tail stock according to claim 2, wherein said compensating means further comprises:
    supporting means operatively connected to said adjusting member for rotatably and tiltably retaining said roller means thereon.

4. A tail stock according to claim 3, wherein said supporting means comprises:
    a first supporting shaft fixedly mounted on said adjusting member;
    a complementary member axially slidably mounted on said adjusting member;
    a second supporting shaft fixedly mounted on said complementary member; and
    means for biasing said first and second supporting shafts apart.

5. A tail stock according to claim 4, wherein said roller means comprises:
    a first roller rotatably and tiltably sustained on said first supporting shaft in abutting engagement with one wall of said guide way; and
    a second roller rotatably and tiltably supported on said second supporting shaft in abutting engagement with the other wall of said guide way.

6. A tail stock according to claim 2, wherein said driving means is operably connected with said adjusting shaft for providing rotational motion thereto.

7. A tail stock according to claim 2, wherein said driving means comprises:
    a hydraulic cylinder provided in said housing;
    a rack piston member slidably mounted in said hydraulic cylinder and automatically actuated in accordance with differences occurring in the diameter of two spaced portions of said workpiece; and a pinion member integrally formed on said adjusting shaft and operatively coupled with said rack piston member for imparting rotational motion to said adjusting shaft.

8. A tail stock according to claim 2, wherein said driving means comprises:

a rotary shaft rotatably mounted on said housing;

a worm fixedly secured to said rotary shaft;

a worm wheel fixedly mounted on said adjusting shaft and meshingly engaged with said worm; and a manual adjustment knob operably connected to said rotary shaft for imparting rotational motion to said adjusting shaft through the cooperation of said worm and worm wheel.

9. A tail stock according to claim 7, wherein said driving means further comprises:

a rotary shaft rotatably mounted on said housing;

a worm fixedly secured to said rotary shaft;

a worm wheel fixedly mounted on said adjusting shaft and meshingly engaged with said worm; and a manual adjustment knob operably connected to said rotary shaft for imparting rotational motion to said adjusting shaft through the cooperation of said worm and worm wheel, independently of the actuation of said rack piston member.

10. A tail stock according to claim 2, wherein said adjusting member is provided with an engaging projection which is received within a recess formed on a bearing member of said housing so as to permit said adjusting member to move axially by a predetermined amount.

11. A tail stock according to claim 4, wherein said biasing means comprises resilient means including a spring which is interposed between said housing and said complementary member.

12. A tail stock according to claim 5, wherein each of said first and second rollers comprises the outer race of a self-aligning ball bearing.

* * * * *